M. J. KALASHEN.
CORNET.
APPLICATION FILED JULY 21, 1914.
1,139,297.
Patented May 11, 1915.
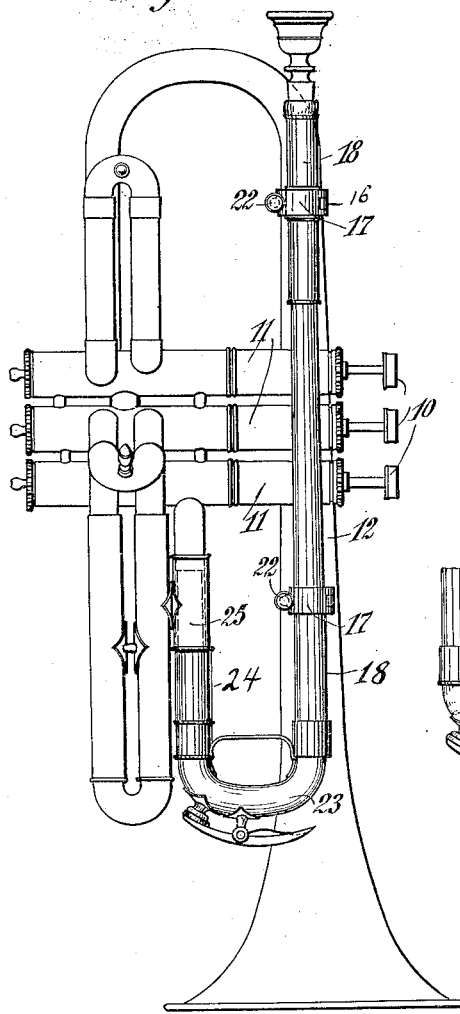
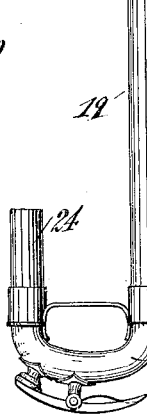
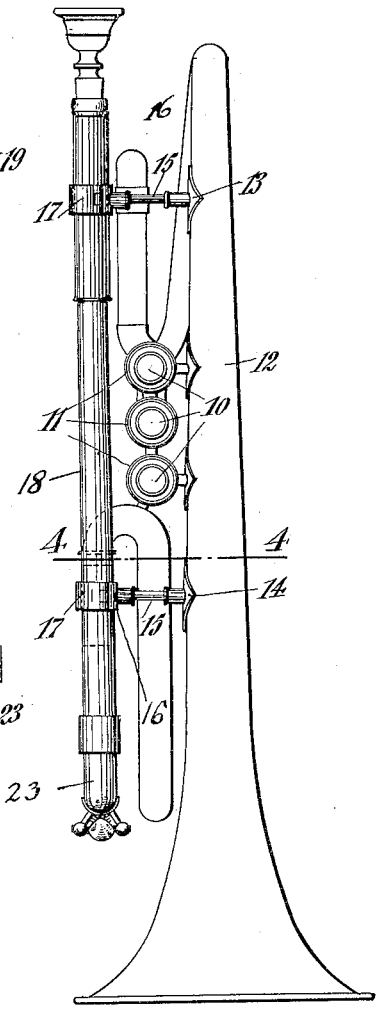
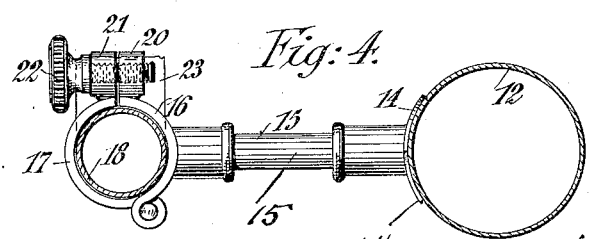
Witnesses:
Joseph Bisbano
W. F. Hogg
Inventor
Mark J. Kalashen
By his Attorney
C. P. Goepel
THE NORRIS PETERS CO., PHOTO-LITHO., WASHINGTON, D. C.

UNITED STATES PATENT OFFICE.

MARK J. KALASHEN, OF BROOKLYN, NEW YORK.

CORNET.

1,139,297. Specification of Letters Patent. Patented May 11, 1915.

Application filed July 21, 1914. Serial No. 852,174.

*To all whom it may concern:*

Be it known that I, MARK J. KALASHEN, a citizen of the United States, residing in New York, borough of Brooklyn, county of Kings, and State of New York, have invented certain new and useful Improvements in Cornets, of which the following is a specification.

The object of the invention is to provide means for definitely changing the pitch of a cornet from high pitch or concert pitch, to low or international pitch. For this purpose, the mouth-piece pipe is made detachable from the rest of the cornet, whereby a mouth-piece pipe of slightly different length may be substituted, thereby causing the change in pitch.

In the accompanying drawing, Figure 1 is a side elevation of the cornet embodying the invention, with the low pitch pipe in position, Fig. 2 is a view at right angles to Fig. 1, Fig. 3 is a view of the shorter mouth-piece pipe, and Fig. 4 is a horizontal section on line 4—4 of Fig. 2, on a larger scale.

Similar reference numerals indicate corresponding parts throughout the figures of the drawing.

The cornet is provided with the usual valves 10 guided in their casings 11, secured to the bell 12 of the instrument. It was hitherto customary to support the mouth-piece pipe upon the valve-casings by soldering the same thereto or to brackets connected with the valve-casings. For the purpose of freeing the mouth-piece pipe and giving the same better support, two brackets are provided according to this invention, said brackets 13 and 14 being attached by solder or otherwise to the bell 12 of the cornet.

Each bracket comprises an arm 15 at the outer end of which is a stationary semicircular clamping-member 16 to which is pivoted a swinging clamping-member 17, the two members coöperating to receive and clamp between them the mouth-piece pipe 18 or 19 as the case may be. The member 16 is provided with a lug 20 and the member 17 with a lug 21.

A thumb-screw 22 passes through both lugs 20 and 21, and thereby screws the swinging member 17 securely upon the mouth-piece pipe.

The mouth-piece pipe is provided beyond its crook 23 with an end 24 adapted to slidably engage a portion 25 of the pipes of the cornet.

The mouth-piece pipe 18 is slightly longer in its elongated straight portion than the pipe 19, but both pipes are of the same diameter, and are in like manner clamped in place, that is to say, either one or the other, according as high or low pitch is desired. For removing, for instance, the mouth-piece pipe 18 from the brackets 13 and 14, it is only necessary to unscrew the thumb-screws 22, and swing the outer member 17 of the clamps open, thereby freeing the mouth-piece pipe from the clamps. The pipe is now pulled endwise, whereby the end 24 is withdrawn from the portion 25 of the cornet pipes. The pipe 19 is then substituted by first inserting this end 24 into the portion 25 of the cornet pipes, and when the same is fully in place therein, then swinging the mouth-piece pipe against the clamps, then closing the swinging members 17 of the clamps, and screwing down the thumb-screws 22, whereby the shorter mouth-piece pipe 19 is held in place.

For changing from high pitch to low pitch, the procedure described is reversed, that is to say, the shorter mouth-piece pipe 19 is removed, and the longer pipe 18 substituted.

It is obvious that the invention is not limited to the particular style of brackets shown, or to any particular lengths of mouth-piece pipe, as any pitch desired may be obtained by substituting a mouth-piece pipe of proper length. Other changes may also be made without departing from the spirit of the invention as set forth in the claims.

I claim:

1. A cornet, comprising a bell, valves and their casings, pipes between the valves and the bell, a mouth-piece pipe detachably supported on the bell, and pipes between the valves and the mouth-piece pipe.

2. A cornet, comprising a bell, valves and their casings, a mouth-piece pipe, pipes between the valves and the bell, pipes between the valves and the mouth-piece pipe, means for detachably supporting on the bell the entire mouth-piece pipe, said mouth-piece pipe having a crook and a slidable connection beyond said crook, and said supporting means comprising two brackets, one located near the mouth-piece end of the mouth-piece pipe, and the other adjacent the crook of said pipe, said mouth-piece pipe being free from said valve-casings between said brackets.

3. A cornet, having a mouth-piece pipe provided with a crook rigidly fixed thereto, said mouth-piece pipe being slidably connected beyond the crook with one of the cornet-pipes, and clamps engaging the elongated main-portion of the mouth-piece pipe for detachably holding the mouth-piece pipe in position.

4. A cornet, having a mouth-piece pipe provided with a crook rigidly fixed thereto, said mouth-piece pipe being slidably connected beyond the crook with one of the cornet-pipes, clamps for detachably engaging the elongated main-portion of the mouth-piece pipe, and brackets extending from the bell and supporting said clamps in the path of swinging movement of the mouth-piece pipe.

In testimony, that I claim the foregoing as my invention, I have signed my name in presence of two subscribing witnesses.

MARK J. KALASHEN.

Witnesses:
JOSEPH BISBAND,
F. HOGG.

Copies of this patent may be obtained for five cents each, by addressing the "Commissioner of Patents, Washington, D. C."